(12) United States Patent
Ladouceur et al.

(10) Patent No.: US 8,217,288 B2
(45) Date of Patent: Jul. 10, 2012

(54) KEY DESIGNS FOR COMPACT KEYPAD OF HANDHELD COMMUNICATION DEVICE

(75) Inventors: Norman M. Ladouceur, Wingham (CA); Jason T. Griffin, Kitchener (CA); Frank M. Tyneski, Solana Beach, CA (US)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/289,298

(22) Filed: Nov. 4, 2011

(65) Prior Publication Data

US 2012/0050169 A1 Mar. 1, 2012

Related U.S. Application Data

(62) Division of application No. 11/832,068, filed on Aug. 1, 2007.

(51) Int. Cl.
*H01H 3/12* (2006.01)
(52) U.S. Cl. ........................................ 200/341
(58) Field of Classification Search ................. 200/341, 200/345, 513; 345/169
See application file for complete search history.

(56) References Cited

U.S. PATENT DOCUMENTS

| | | |
|---|---|---|
| 3,940,585 A | 2/1976 | Schaad |
| 3,982,081 A | 9/1976 | Demler |
| 4,029,915 A | 6/1977 | Ojima |
| 4,218,599 A | 8/1980 | Garn |
| 4,298,778 A | 11/1981 | Beresford-Jones |
| 4,447,681 A | 5/1984 | Desmarais |
| 5,008,505 A | 4/1991 | Takano et al. |
| 5,141,343 A | 8/1992 | Roylance et al. |
| 5,172,114 A * | 12/1992 | Bedoya et al. .............. 341/27 |
| 5,717,429 A | 2/1998 | Coulon et al. |
| 5,921,381 A | 7/1999 | Von Arx |
| 6,121,563 A | 9/2000 | Hochgesang et al. |
| 6,153,844 A | 11/2000 | Hyono et al. |
| 6,365,848 B1 | 4/2002 | Maple |
| 7,667,153 B2 | 2/2010 | Steidle et al. |

(Continued)

FOREIGN PATENT DOCUMENTS

DE 27 29 157 A1 1/1979

(Continued)

OTHER PUBLICATIONS

EPO: Communication pursuant to Article 94(3) EPC (Office Action) dated Oct. 1, 2010 for Application No. 07113609.7-1231 (4 pages).

(Continued)

*Primary Examiner* — Vanessa Girardi
(74) *Attorney, Agent, or Firm* — Jones Day

(57) ABSTRACT

A keypad for a mobile device having a housing comprises a plurality of keys coupled to the housing. Each of the keys has means for making the selection of smaller key sizes easier for a user. The keys may incorporate a flexible or resilient upper part, or be configured to transform to a larger surface area upon the application of pressure. The keys may be configured to rotate away from a selected key. The keys adjacent a selected key may be configured to lock mechanically or electrically. The keys may have multiple parts that are movable relative to one another. The upper part of the key may include a fluid, with a selection rod positioned inside the upper part to enter the fluid.

2 Claims, 10 Drawing Sheets

U.S. PATENT DOCUMENTS

Figure 1:
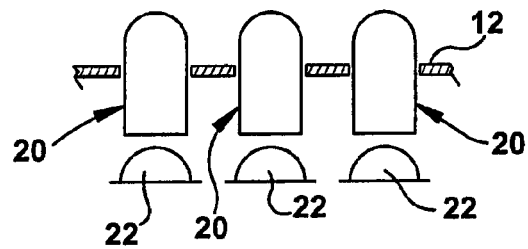

| | | |
|---|---|---|
| 2005/0109602 A1 | 5/2005 | Parkinson et al. |
| 2005/0237230 A1 | 10/2005 | Bejean |
| 2006/0038773 A1 | 2/2006 | Nurmi |
| 2007/0152960 A1 | 7/2007 | Huang |

FOREIGN PATENT DOCUMENTS

| | | |
|---|---|---|
| DE | 201 03 570 U1 | 5/2001 |
| DE | 103 00 619 A1 | 7/2004 |
| WO | 2007/079986 A2 | 7/2007 |

OTHER PUBLICATIONS

CIPO: Requisition by the Examiner (Office Action) dated Mar. 1, 2011 for Application No. 2,637,362 (2 pages).

EPO: Communication (extended European search report) dated Mar. 12, 2008 for Application No. 07113609.7-1231 (13 pages).

* cited by examiner

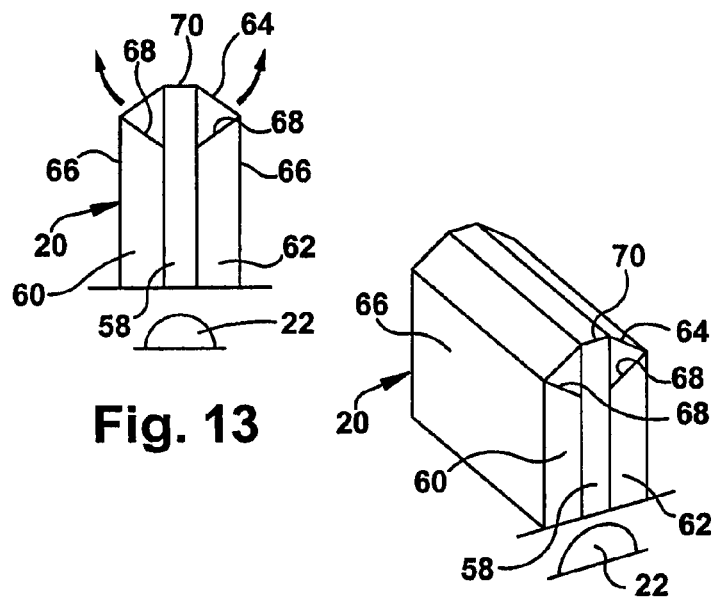
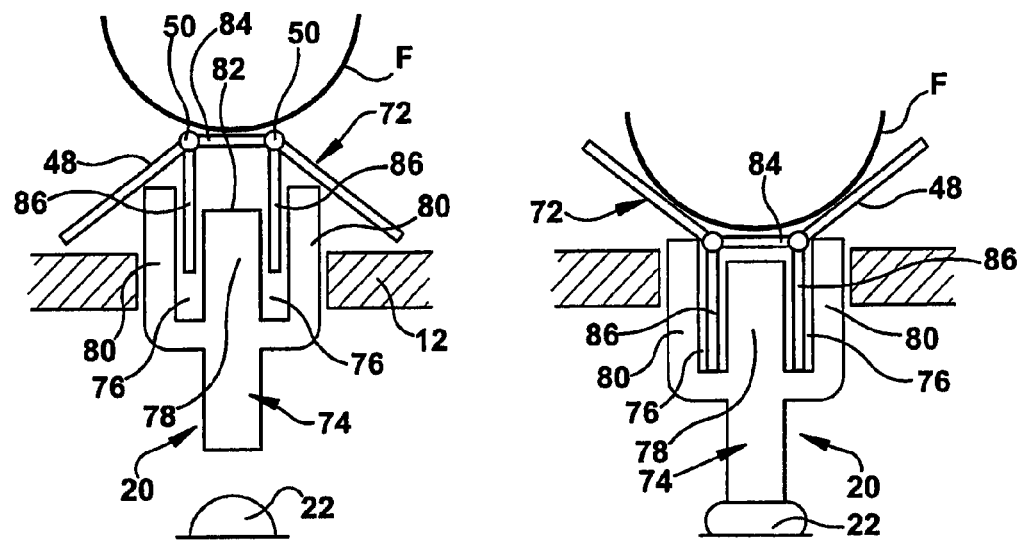

US 8,217,288 B2

KEY DESIGNS FOR COMPACT KEYPAD OF HANDHELD COMMUNICATION DEVICE

CROSS-REFERENCE TO RELATED APPLICATION

This is a divisional of U.S. patent application Ser. No. 11/832,068, filed on Aug. 1, 2007. The complete disclosure of this prior application, including the drawings, is hereby incorporated into this application by reference.

FIELD

This technology relates to key and keypad designs for compact keypads. In particular, the technology concerns key designs for improving the quality, enhancing the reliability, and/or reducing the fatigue associated with typing on compact keypads.

BACKGROUND

The use of mobile handheld communication devices has increased. Examples of such mobile communication devices include mobile stations, cellular telephones, wireless personal digital assistants (PDAs), two-way paging devices, and others. Consumers desire smaller handheld communication devices because, inter alia, they are often carried on the body. As a result, keypads or keypads on handheld communication devices must be made smaller as the size of devices becomes smaller. In addition, as the transmission of emails from handheld communication devices becomes more popular, users are required to type messages using the keypads of handheld devices. Smaller keys are often associated with smaller keypads. When smaller keys are utilized, users are prone to activate more than one key at a time, or to accidentally activate the wrong key. This results in reliability issues.

An example of a keypad that is being utilized on devices that transmit email on handheld communication devices is the SureType™ keypad, by Research in Motion Limited of Waterloo, Ontario, Canada. This keypad utilizes a standard alphabetic key arrangement in the form of a reduced QWERTY array of alphabetic letters, such that fewer than 26 keys are utilized to display the entire alphabetic key layout. In addition, numbers share keys with alphabetic characters. Information concerning the SureType™ keypad is disclosed in U.S. Pat. No. 7,083,342, the disclosure of which is incorporated herein by reference in its entirety.

One current solution requires that increased pressure be required in order to activate a key. Increasing the amount of localized pressure that is required to activate a key helps to prevent accidental activation, but, at the same time, results in greater fatigue on the part of the user. Accidental activation of keys detracts from the user's impression of quality and usability of the handheld communication device. This ultimately can have an impact on the popularity of a product.

SUMMARY

Example keypads are described and claimed.

BRIEF DESCRIPTION OF THE DRAWING FIGURES

Figure 2:
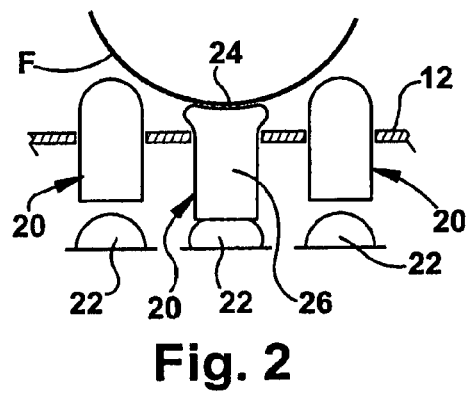
Figure 3:
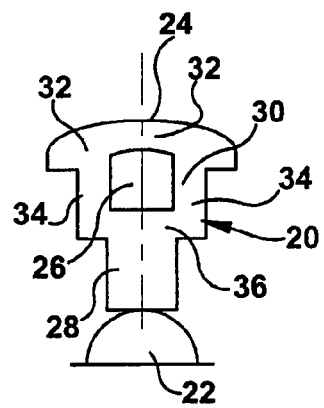
Figure 4:
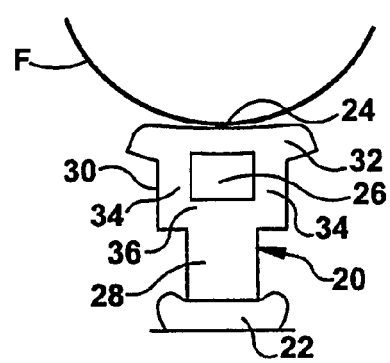
Figure 5:
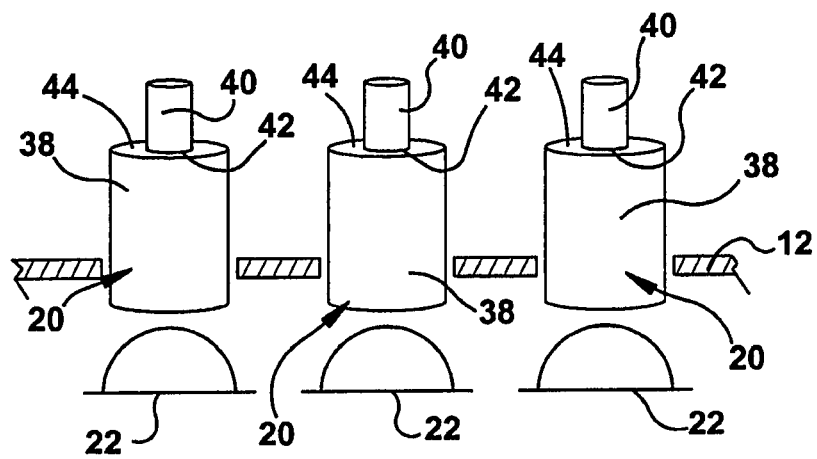
Figure 6:
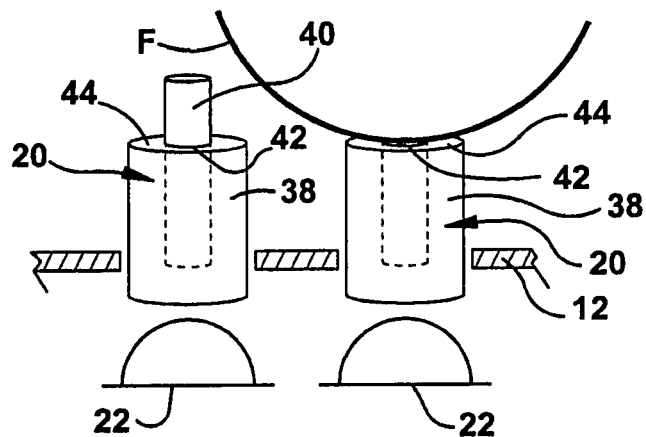
Figure 7:
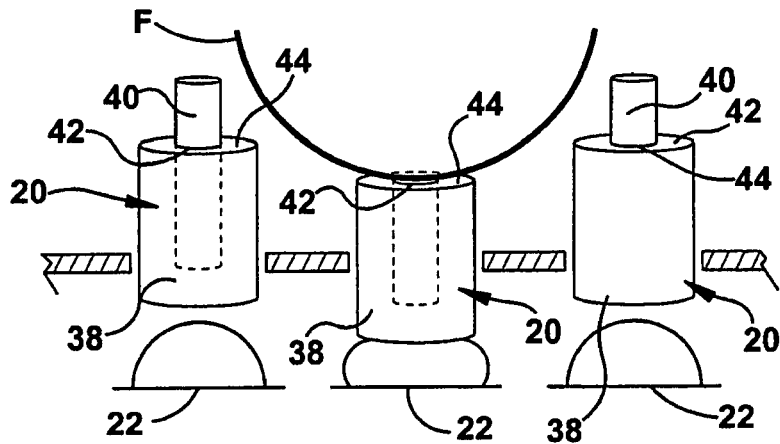
Figure 8:
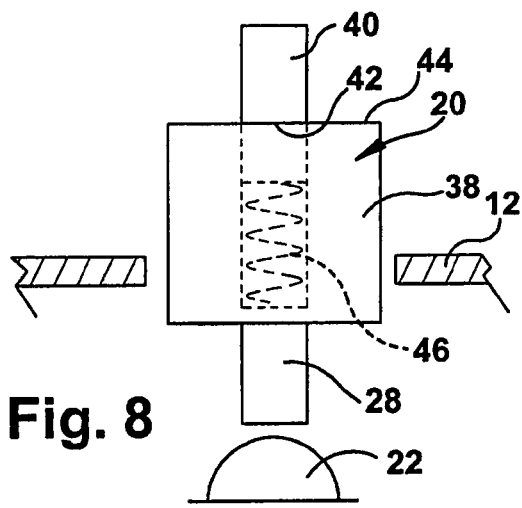
Figure 9:
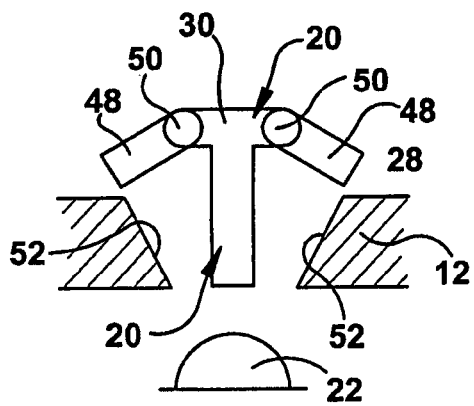
Figure 10:
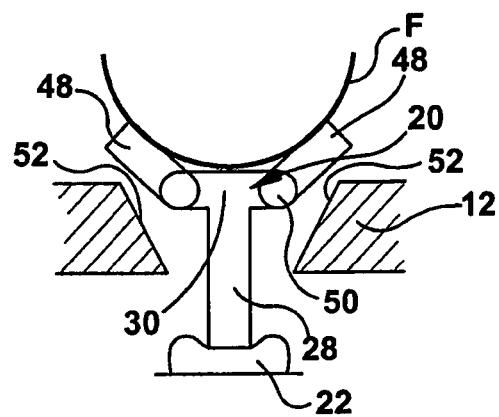
Figure 11:
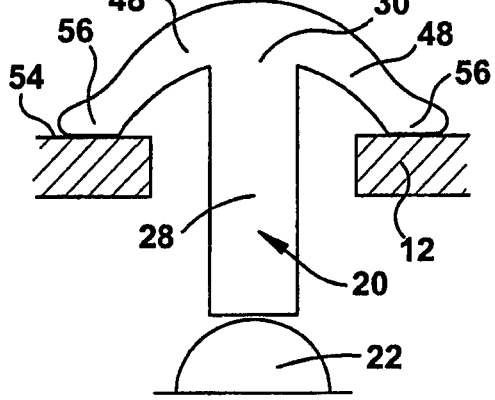
Figure 12:
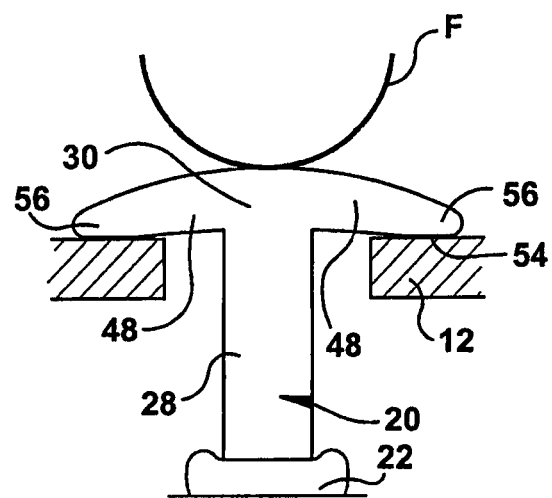
Figure 18:
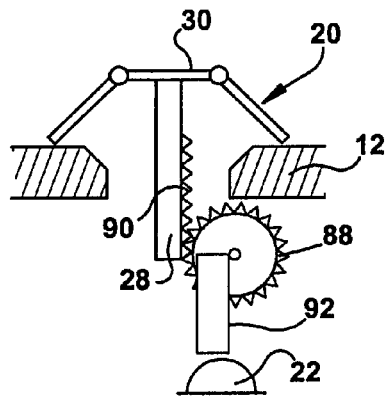
Figure 19:
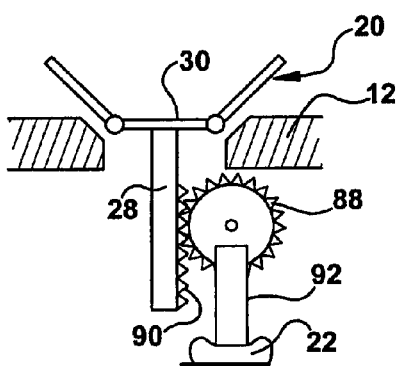
Figure 20:
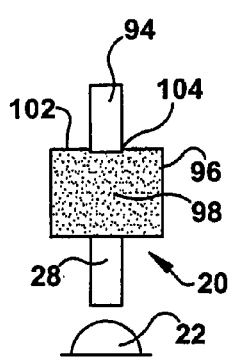
Figure 21:
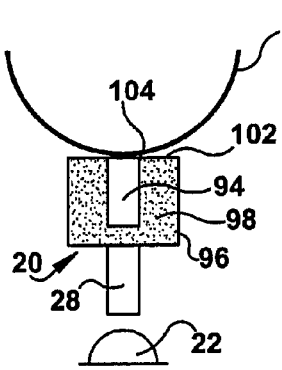
Figure 22:
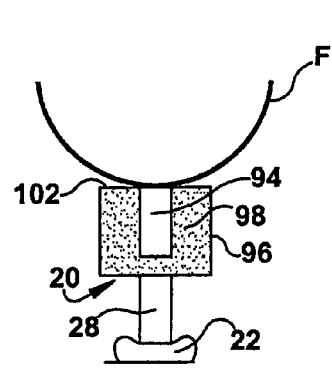
Figure 23:
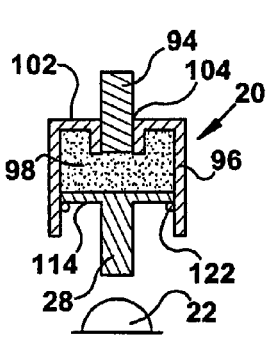
Figure 24:
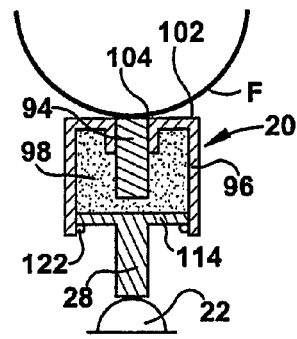
Figure 25:
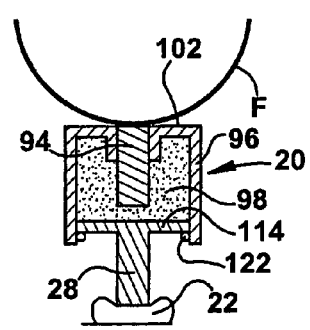
Figure 26:
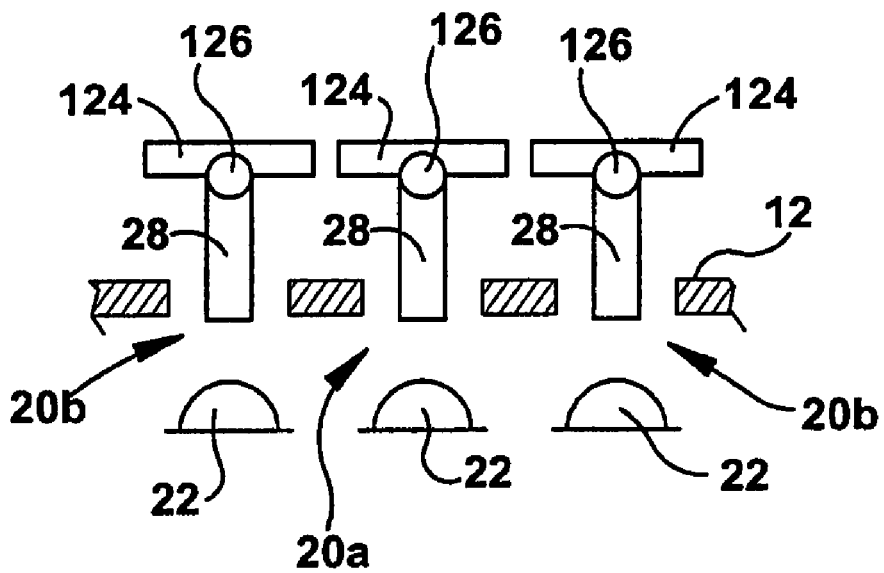
Figure 27:
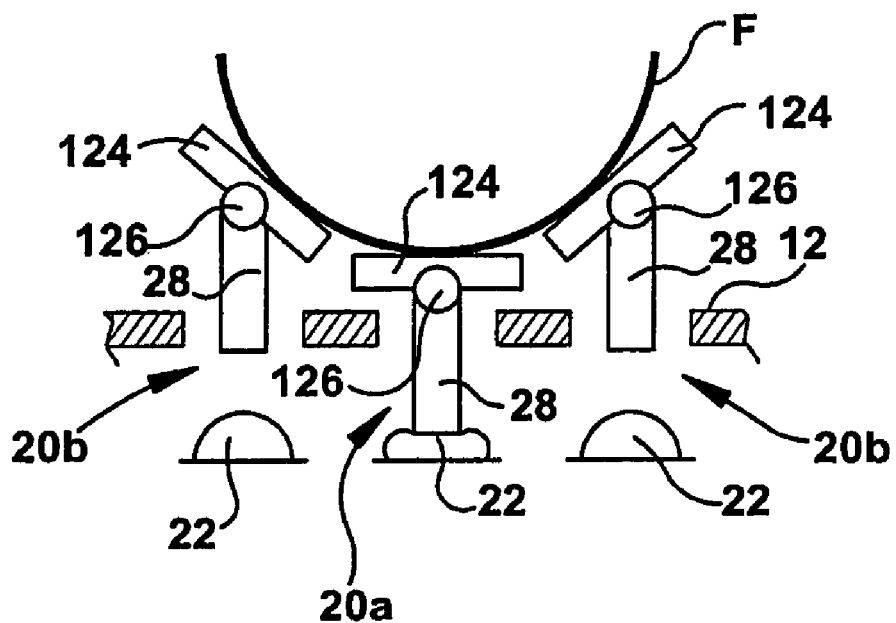
Figure 28:
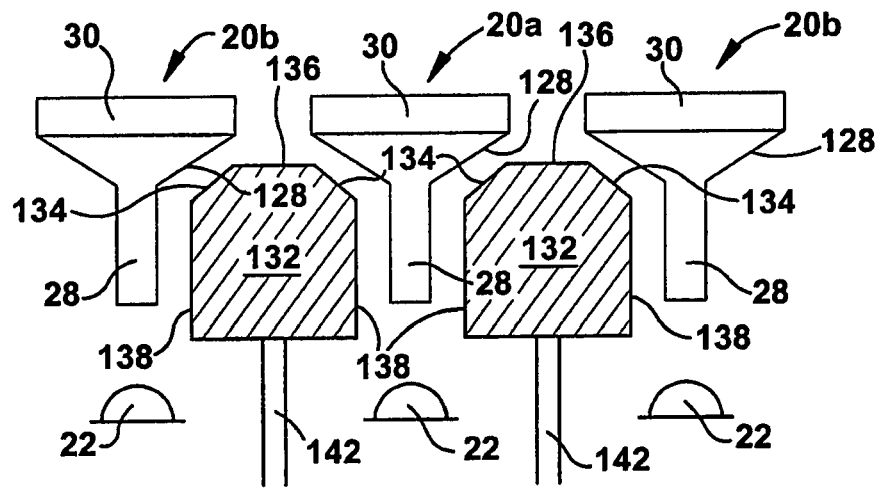
Figure 29:
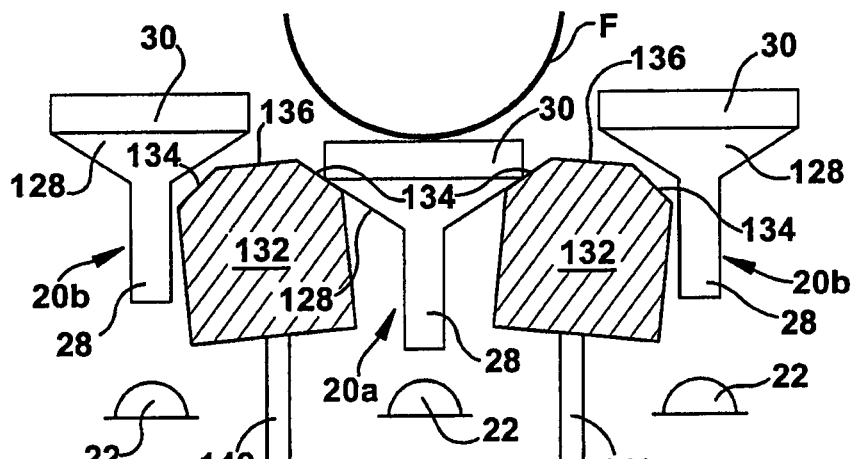
Figure 30:
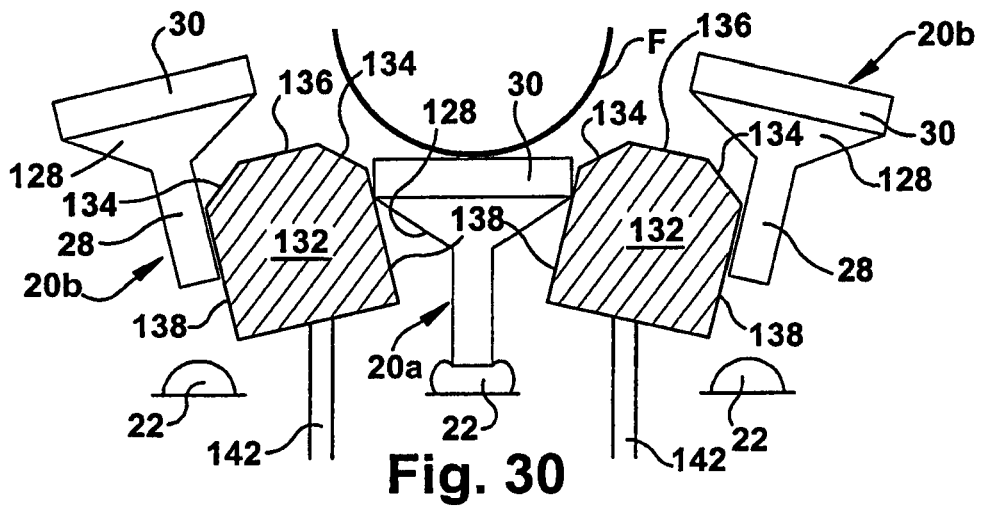
Figure 31:
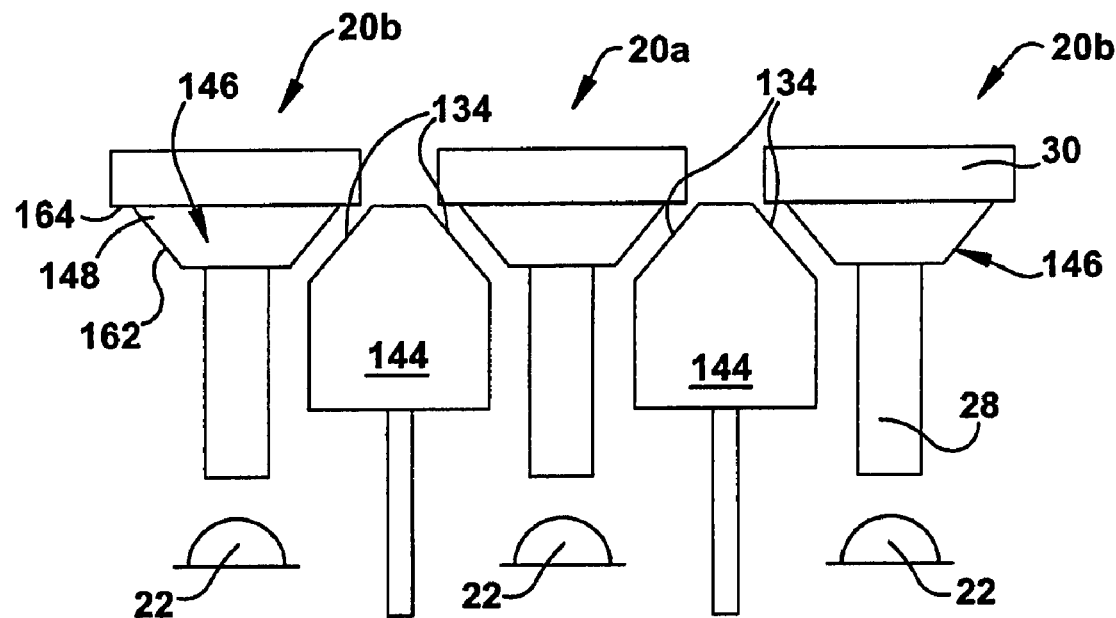
Figure 32:
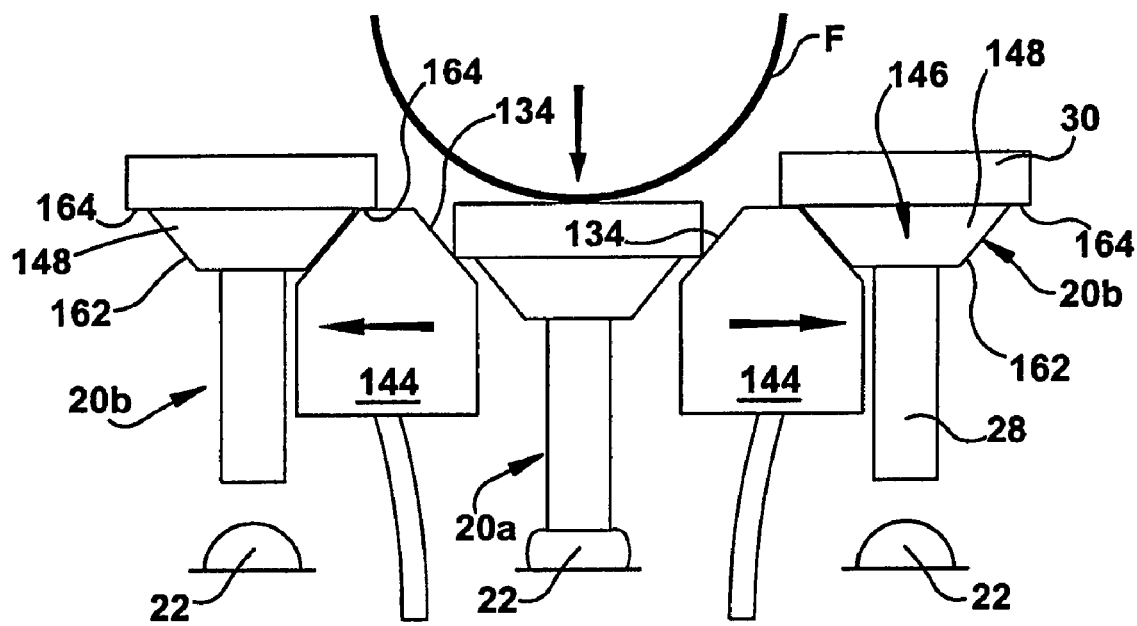
Figure 33:
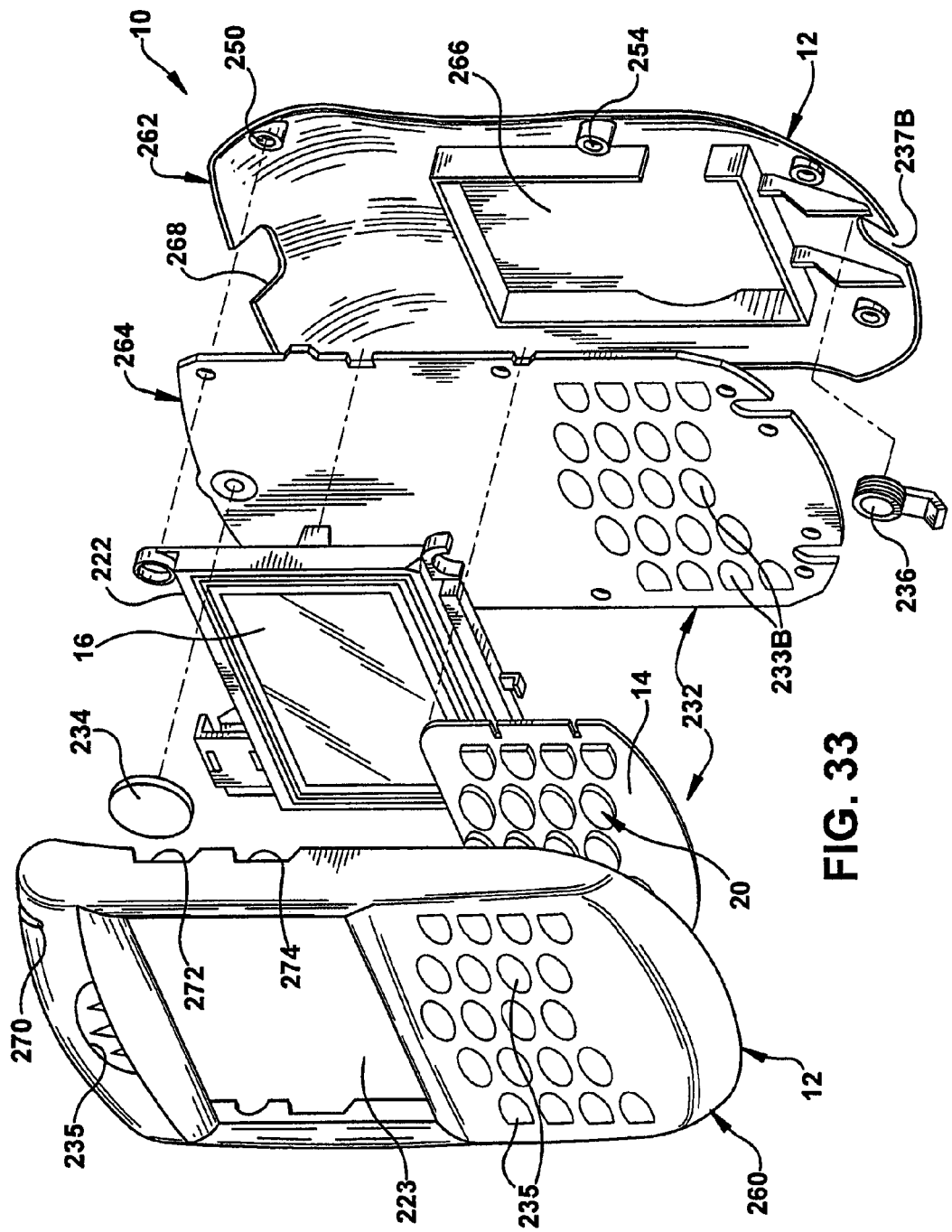
Figure 34:
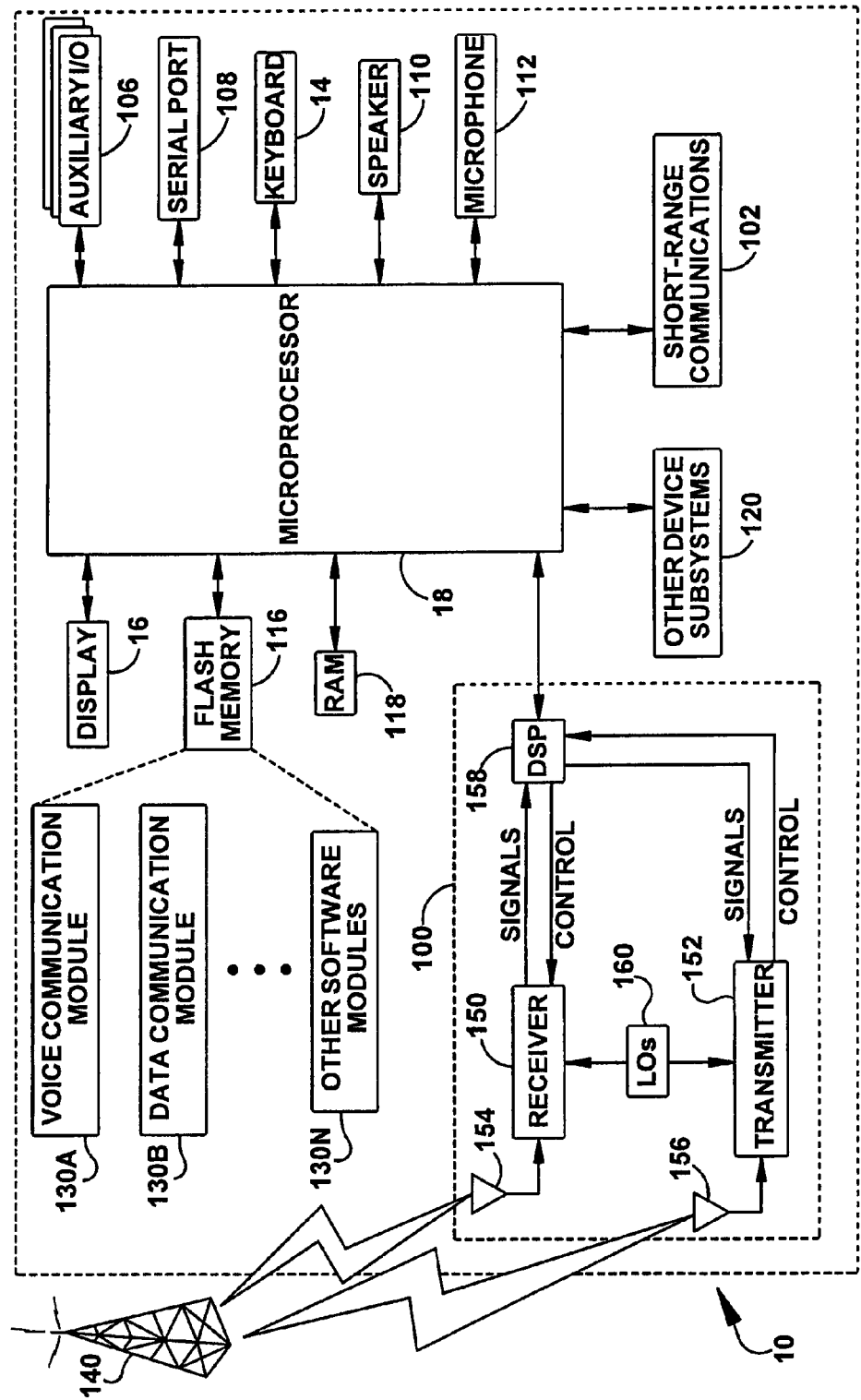

FIG. 1 is a schematic view of an example plurality of keys of a keypad in a resting position;
FIG. 2 is a schematic view of the example plurality of keys of FIG. 1 in an activated position;
FIG. 3 is a schematic view of an alternative example key in a resting position;
FIG. 4 is a schematic view of the example key of FIG. 3 is an activated position;
FIG. 5 is a schematic view of another example plurality of keys of a keypad in a resting position;
FIG. 6 is a schematic view of the example plurality of keys of FIG. 5 in a partially activated position;
FIG. 7 is a schematic view of the example plurality of keys of FIG. 5 in an activated position;
FIG. 8 is a side view of the key of FIGS. 5-8;
FIG. 9 is a schematic view of an alternative example key in a resting position;
FIG. 10 is a schematic view of the example key of FIG. 9 in an activated position;
FIG. 11 is a schematic view of yet another example key in a resting position;
FIG. 12 is a schematic view of the key of FIG. 12 in an activated position;
FIG. 13 is a schematic view of another example key in a resting position;
FIG. 14 is a perspective schematic view of the key of FIG. 13;
FIG. 15 is a schematic view of the key of FIGS. 13-14 in an activated position;
FIG. 16 is a schematic view of an alternative example key in a resting position;
FIG. 17 is a schematic view of the key of FIG. 16 in an activated position;
FIG. 18 is a schematic view of an alternative example key system in a resting position;
FIG. 19 is a schematic view of the key system shown in FIG. 18;
FIG. 20 is a cross-sectional side view of an alternative example key in a resting position;
FIG. 21 is a cross-sectional side view of the key of FIG. 20 in a partially activated position;
FIG. 22 is a cross-sectional side view of the key of FIG. 20 in an activated position;
FIG. 23 is a cross-sectional side view of a different example key in a resting position;
FIG. 24 is a cross-sectional side view of the key of FIG. 23 in a partially activated position;
FIG. 25 is a cross-sectional view of the key of FIG. 23 in an activated position;
FIG. 26 is a schematic cross-sectional side view of another example plurality of keys in a resting position;
FIG. 27 is a schematic cross-sectional side view of the keys of FIG. 26 is an activated position;
FIG. 28 is a schematic cross-sectional side view of an alternative example plurality of keys in a resting position;
FIG. 29 is a schematic cross-sectional side view of the keys of FIG. 28 in a partially activated position;
FIG. 30 is a schematic cross-sectional side view of the keys of FIGS. 28-29 in an activated position;
FIG. 31 is a schematic cross-sectional side view of another alternative example plurality of keys in a resting position;
FIG. 32 is a schematic cross-sectional side view of the plurality of keys of FIG. 31 in an activated position;
FIG. 33 is an exploded view of a mobile communication device incorporating a keypad arrangement for use with the example keys; and
FIG. 34 is a block diagram illustrating the subsystems of interest in the mobile communication device.

DETAILED DESCRIPTION

Example keys 20 are shown schematically in FIGS. 1-32 in various resting, partially activated and activated positions.

The keys 20 are designed for usage in a handheld communication device 10, such as a mobile communication device, mobile station, cellular telephone, wireless personal digital assistant (PDA), personal information manager (PIM), two-way paging device, and others (hereinafter "mobile device"). Any type of mobile device 10 may be utilized with the example keys 20. The examples keys 20 are shown, in many cases, seated in a housing 12 of a mobile device 10. It is understood, however, that the housing 12 is shown only for illustrative purposes. The keys 20 may be used with or without a housing 12 as indicated. A switch 22, such as a dome switch, is also shown coupled to each of the keys 20 presented in the figures. The dome switches 22 depicted are known in the art and are activated by pressing down on the dome. Other types of switches may alternatively be utilized, the switches not being limited to the dome-type of switches shown.

Each of the example key 20 designs depicted in FIGS. 1-32 are designed to make the selection of the key 20 easier for a user. As discussed in the background section, form factors for mobile devices have become smaller and smaller, to the point where key size has also become very small. Smaller keys 20 are harder to activate by a user since the user's finger, or thumb, is often larger than the key 20 itself. The example keys 20 of FIGS. 1-32 are designed to improve the quality and enhance the reliability of typing on a compact typing keypad 14, which in turn improves the overall user experience while typing on tightly space keypads. The example keys 20 are also designed to reduce fatigue associated with excessive key activation pressure.

The example key designs are particularly useful in compact thumb typing keypads—those well suited for typing only with the user's thumbs. In mobile devices 10 of this type, the mobile device 10 is typically held in the palms of two hands while the user types with both thumbs on the keypad 14. Keypads of this type often are full alphanumeric keypads. The present example key designs make the selection of a key 20 easier and more reliable by such techniques as changing the shape or size of the key 20 as its pressed, moving keys 20b adjacent the selected key 20a out of the way, and locking keys 20b adjacent the selected key 20a to deter unintended pressing. As used herein, the term finger is defined as including all four fingers and thumb of the hand. The keys 20 may be selected by one of the four fingers or by the thumb. For simplicity, the term "finger" is used herein instead of referring to both the fingers and thumb.

In particular, four different design concepts are utilized to reduce accidental activation of keys 20 while identifying methods of reducing localized pressure required to activate the key switches 22 and reducing fatigue. A first concept is shown and described in connection with FIGS. 1-25, which depict variations of this concept, where the keys 20 have an initially small surface area that transforms into a larger surface area upon initial activation. With this concept, the size of the key 20 presented to the user is small, allowing for easier selection, but the actual user experience provide an increase in surface area to push, which results in less user fatigue and operating pressure. In some of the examples within this concept, a larger outer portion is raised up to meet the user's finger, thus providing a significantly larger key to reduce activation pressure.

A second concept is shown and described in connection with FIGS. 26-27, where keys 20b adjacent to the selected key 20a tilt away as the selected key 20a is pressed. In this design, the adjacent keys 20b tilt out of the way when a selected key 20a is pushed, thereby deterring an accidental press.

A third concept is shown and described in FIGS. 28-30, where keys 20b adjacent to the selected key 20a rotate away from the selected key 20a as the selected key 20a is pressed.

In this design, when a key 20a is pressed, the adjacent keys 20b move out of the way to allow for the selected key 20a to travel to activate the switch 22. The adjacent keys 20b may or may not lock in this example.

A fourth concept is shown and described in FIGS. 31-32, where the keys 20b adjacent to the selected key 20a are locked in place upon the initial activation of the selected key 20a. This design reduces typing errors and improves the quality of the user experience. Each example will be described in greater detail herein.

Referring to the Figures, FIGS. 1-2 depict an example plurality of keys 20 for use in a keypad 14 of a mobile device 10. The keys 20 are shown positioned in a housing 12 with a dome switch 22 positioned beneath each key 20. Each key 20 within this example is at least in part elastic and deformable. The keys 20 are shown in their resting position in FIG. 1 and in the pressed and activated position in FIG. 2. As is evident, because the keys 20 are made of an elastic material, when one of the keys 20 is pressed, the upper surface area 24 of the key 20 increases to wrap around part of the finger F of the user and the center 26 of the key 20 collapses. This malleable key 20 is easier on a user's fingers. In addition, by allowing the center 26 of the key 20 to collapse, this aids in the stability and alignment of the key 20 with the underlying dome switch 22. Because the upper surface area 24 of the key 20 increases as pressure is applied, it is easier to press the key 20 to activate the switch 22. In this example, the keys 20 could be made of an outer elastic material that is filled with gel or air. One type of material that may be used is an elastomeric material, such as urethane or rubber. Other types of materials and configurations are possible. In this example, the force required for deformation of the key 20 must also be sufficient to activate the underlying dome switch 22.

FIGS. 3-4 depict another example key 20 for use in a keypad 14 of a mobile device 10. As with the prior example in FIGS. 1-2, the key 20 in this example is at least in part elastic and deformable. The key 20 has a shape that allows the key 20 to deform upon the application of pressure to the top surface 24 of the key 20, which includes a post 28 and an upper portion 30. The upper portion 30 is hollow and includes a top wall 32 and side walls 34 that extend downwardly to a bottom wall 36. The bottom wall 36 is connected to the post 28. The key 20 is shown positioned above a dome switch 22 for use in a housing 12 of a mobile device 10 in a resting position in FIG. 3 and an activated position in FIG. 4. The key 20 is made of an elastic material and the hollow central opening 26 of the upper portion 30 allows for greater deformation of the top surface 24 of the key 20. In the resting position, the key 20 starts out with a convex upper surface 24, which transforms to a concave upper surface 24 upon application of pressure by a finger F of a user. As shown in FIG. 4, because the top surface 24 of the key 20 is malleable, it deforms to substantially fit the shape of the finger F, making the key 20 easier to press. Any type of elastomeric, deformable material may be used, such as rubber, urethane, plastics, or any other elastomeric materials. The upper surface 24 of each key 20 is rounded, which is more comfortable to the touch. The force required to deform the key 20 must be sufficient to activate the underlying dome switch 22.

FIGS. 5-7 depict an alternative example keypad 14 arrangement showing keys 20 positioned in a housing 12 of a mobile device 10, with a dome switch 22 associated with a lower end of each key 20. Each key 20 has a cylindrical lower portion 38 and a cylindrical upper portion 40, with the lower portion 38 having a greater diameter than the upper portion 40. The upper portion 40 seats in a centrally located axial opening 42 in the lower portion 38. In the resting position of FIG. 5, the upper portion 40 protrudes above the upper surface 44 of the lower portion 38 and provides a small surface area for contacting a user's finger F. This provides greater space around each key 20 making it easier to initially engage the selected key 20a. Upon application of pressure to the upper portion 40 of one of the keys 20, the lower portion 38 rises up as the upper portion 40 lowers into the interior opening 42 of the lower portion 38 until the upper surface 44 of the lower portion 38 meets the finger F of the user. This makes it easier for the key 20 to be pressed because of the larger surface area, while also making it easier for a user to initially select the key 20. FIG. 8 shows a possible mechanism inside the key 20 in the form of a spring return 46. In addition, FIG. 8 shows a post 28 protruding from the bottom of the lower portion 38. In FIGS. 5-7, the lower portion 38 engages the dome switch 22 when the key 20 is fully pressed. In FIG. 8, the lower post 28 engages the dome switch 22 when the key 20 is fully pressed. One type of mechanism that may be used to raise the lower portion upwardly is a piston (not shown), such as an air filled piston, or a spring mechanism or linkage. The force required to cause the lower portion 38 to rise up is less than the force to trigger the underlying dome switch 22, such that a user has to press the lower portion 38 and upper portion 40 of a respective key 20 in order to activate the dome switch 22.

FIGS. 9 and 10 depict an alternative example key 20 for use in a keypad 14 of a mobile device 10 having a housing 12, with a dome switch 22 positioned under the key 20. In this example key, the key 20 is "T" shaped and has a longitudinally, downwardly extending post 28 for contacting the dome switch 22 and a transversely extending upper portion 30 that forms the top part of the "T." The upper portion 30 is for contacting a user's finger. Two arms 48 are coupled to the upper portion 30 of the key 20 via hinges or linkages 50, with an arm 48 extending from each side of the upper portion 30 and each arm 48 being movable in both a downward rotation and an upward rotation about the hinge or linkage 50. The hinge 50 may be any known type of hinge, including a mechanical hinge or a living hinge. The hinges 50 allow the arms 48 to rotate at least 130 degrees. In this example, the housing 12 has angled portions 52 positioned adjacent the key 20. The angled portions 52 interact with the arms 48 and upper portion 30 of the key 20 such that when the key 20 is depressed by a user, the post 28 moves downwardly toward the dome switch 22 and the arms 48 rotate upwardly as they contact the housing 12 of the mobile device 10. As shown in FIG. 10, the arms 48 and upper portion 30 can be configured, along with the housing 12, such that the key 20 wraps around a finger F of a user when it is depressed. This makes it easier for a user to determine that they are pressing the correct key, thereby making the keypad 14 easier to use. This improves the overall user experience. The force required to cause the arms 48 to rise up is less than the force to trigger the underlying dome switch 22, such that a user has to press downwardly on the upper portion 30 and arms 48 in order to activate the dome switch 22.

The keys 20 of FIGS. 11-12 are similar to the keys 20 shown in FIGS. 9 and 10, but the keys 20 in FIGS. 11-12 have an elastic upper portion 30 that is bendable instead of a hinged portion. As shown in FIG. 11, the example key 20 has a post 28 and an upper portion 30. The upper portion 30 is positioned on an outer surface 54 of the housing 12 while the post 28 extends into the housing 12 in proximity to a dome switch 22. The upper portion 30 of the key 20 has two arms 48 that extend outwardly and abut the outer surface 54 of the housing 12. The arms 48 are thinner in cross-section than the thickness of the post 28 in order to allow deflection. Each arm 48 has a knob 56 positioned on the end, with the knob 56 being wider and thicker than the arms 48. The knobs 56 seat on the surface 54 of the housing 12. The upper portion 30 is elastic such that when a user depresses the example key, as shown in FIG. 12, the upper portion 30 of the key 20 flattens. The arms 48 deflect outwardly. The knobs 56 remain positioned on the top surface 54 of the housing 12 and move outwardly as the shape of the key 20 goes from an inverted U-shape to a flat shape. As the key 20 is depressed further, the post 28 moves downwardly until it engages a dome switch 22, as shown in FIG. 12. In this example, the upper portion 30 is elastic and made of an elastomeric material. The lower portion or post 28 may also be elastic, but could be other materials, like plastic, metal, or otherwise. It the material of the post 28 is different from the material of the upper portion 30, a coupling mechanism (not shown) is provided between the upper portion 30 and the post 28, such as a hinge, glue, a pin, or some other joining mechanism or technique. Where both the upper portion 30 and the post 28 are made of an elastomeric material, they may be integrally formed as a single piece, if so desired. This example key 20 responds in a tactile sensory manner to a user's touch. The upper portion 30 forms a raised bump which, before it is depressed, provides an easy target for a user's finger. As the key 20 is depressed, the surface area in contact with a user's finger becomes larger, making it easier for the user to locate and continue to press the key 20. The force required to flatten the upper portion 30 is the same as or less than the force to trigger the underlying dome switch 22, such that a user has to press downwardly on the upper portion 30 in order to activate the dome switch 22.

FIGS. 13-15 depict an example key 20 similar to that of FIGS. 3 and 4, except in a mechanical instead of elastomeric format. In this example key, the key 20 is made up of several parts, including a center post 58 surrounded on either side by a first post 60 and a second post 60. In addition, an upper member 64 is coupled to the center, first, and second posts 58, 60, 62. The upper member 64 may be a flat elastomeric piece of material that is coupled to the upper surface of the center post 58 and to the sides 66 of the first and second posts 60, 62. The upper member 64 is preferably flexible and may be made of an elastomeric material, but could be made of other materials.

The center post 58 is approximately rectangular in cross-section, as shown in FIG. 13. The first and second posts 60, 62 are trapezoidal in cross-section and include an inwardly angled upper surface 68 that angles inwardly from the side walls 66 to the center post 58. The first and second posts 60, 62 are coupled to a spring or piston mechanism (not shown) that acts upon the first and second posts 60, 62 when the center post 58 is depressed by a user. A latch (not shown) is included with each key 20 to maintain the first and second posts 60, 62 in the unpressed position shown in FIG. 13 until such time as the upper surface of the center post 58 is depressed. In the resting position, an upper surface 70 is present on the upper member 64 that corresponds to the shape and size of the top of the center post 58. This upper surface 70 is easily engaged by a user's finger.

As shown in FIG. 15, when the upper surface 70 is depressed by a user's finger, the latch (not shown) holding the first and second posts 60, 62 in the rest position of FIGS. 13 and 14 is released and the first and second posts 60, 62 move upwardly to meet the finger. They may move upwardly via a piston, such as an air-filled piston, or a spring or linkage mechanism. Because the first and second posts 60, 62 have inwardly angled surfaces 68, as they move upwardly, the elastomeric material of the upper member 64 is pressed upwardly to envelope the finger of a user in order to make it easier to depress the key 20. This also provides tactile feedback to the user to assure the user that they have selected the correct key 20. Once the key 20 has been depressed, the key 20 returns to its latched position, shown in FIGS. 13 and 14. The force required to press the center post 58 to activate the raising mechanism is the same as or less than the force to trigger the underlying dome switch 22, such that a user has to press downwardly on the upper surface 70 in order to activate the dome switch 22. While not shown, instead of three parts, the outer two parts may comprise a single part. In this example, the center post would be cylindrical and surrounded by a cylindrical outer post having an inwardly slanted upper surface.

FIGS. 16-17 depict another example key 20. In this example, the key 20 includes two parts, an upper part 72 and a lower part 74. The lower part 74 is pitch-fork shaped and has two recesses 76 for receiving the upper part 72 therein. The lower part 74 includes a center post 78 and two arms 80 that extend outwardly and upwardly from the side of the center post 78 to form the forks of the pitch fork. The two recesses 76 are defined between each arm 80 and the center post 78. The center post 78 has a height that is slightly less than the height of the other two arms 80, such that the top surface 82 of the center post 78 is recessed relative to the arms 80.

FIG. 16 shows the key 20 in a resting position and FIG. 17 shows the key 20 in a selected position. The center post 78 of the lower part 74 of the key 20 extends downwardly into the housing 12 of the mobile device 10 to contact a dome switch 22. The lower part 74 is non-elastomeric and may be made of any material, such as plastic or metal. The upper part 72 of the key 20 includes an upper wall 84 that is coupled to two downwardly extending legs 86 that extend perpendicular to the upper wall 84, although they may extend at an angle relative to the upper wall 84, if desired. Two upper arms 48 are coupled to the side edges of the upper wall 84. The arms 48 may be coupled by a hinge 50, such as a mechanical or living hinge, or linkage. Alternatively, the upper part 72 may be elastomeric such that the arms 48 bend elastomerically when the key 20 is depressed and may be formed integrally with the legs 86 and upper wall 84. The upper wall 84 has a thickness that is approximately equal to or less than the height difference between the center post 78 and the other two arms 48 of the lower part 74.

As shown in FIGS. 16 and 17, the two legs 86 of the upper part 72 seat in the two recesses 76 defined in the lower part 74. The recesses 76, along with the legs 86 are configured so that the legs 86 fit movably inside the recesses 76 so that the key 20 will not be easily disassembled, but so that the upper part 72 is movable relative to the lower part 74. While not shown, a return mechanism is preferably provided such that when the key 20 is depressed, the upper part 72 automatically springs back into a non-depressed state. A spring or other return mechanism may be used in this and all the other example keys 20.

As shown in FIG. 17, when the upper part 72 is depressed by a finger F of a user, the upper part 72 moves downwardly into the lower part 74 such that the upper wall 84 moves into position adjacent the top surface 82 of the center post 78 and the arms 48 of the upper part 72 act against the two arms 80 of the lower part 74. In this manner, the upper wall 84 is used to initially contact the key 20 by the user's finger F, and, as the key 20 is depressed, the size of the upper surface of the key 20 enlarges by the movement of the arms 48 against the user's finger F as the key 20 is depressed. This makes the key 20 easier to select and depress, thereby improving the overall user experience with the keypad 14. When the key 20 is fully depressed, as shown in FIG. 17, the dome switch 22 is activated. The arms 48 of the upper part 72 move upwardly by flexing or via hinges or linkages that connect them to the upper wall 84 of the upper part 72. The force required to flex or bend the upper part 72 is the same as or less than the force to trigger the underlying dome switch 22, such that a user has to press downwardly on the upper part 72 in order to activate the dome switch 22.

The key 20 shown in FIGS. 18-19 is similar to the key 20 shown in FIGS. 9 and 10, but incorporates a gear 88 and a rack 90 that are coupled to the post 28 of the key 20. The rack 90 is shown as being integral with the post 28 and the gear 88 is positioned in communication with the rack 90. A push rod 92 is coupled to the gear 88 instead of being coupled to the key 20 and the push rod 92 is aligned with a dome switch 22 in order to activate the key 20. The gear 88 is configured such that downward movement of the key 20 is greater than the movement of the push rod 92, thereby making the key 20 move a greater distance in order to activate the dome switch 22. This design makes it easier for the user to know that they have selected a particular key 20 since the movement of the key 20 is more obvious than it would be without the gear 88 and push rod 92. The push rod 92 is coupled to the gear 88 via any known means, such as via a pin or other mechanism. The push rod 92 may rotate relative to the gear 88 such that the push rod 92 always remains vertically oriented.

FIGS. 20-22 depict another example key 20 where fluid displacement is utilized in order to activate the dome switch 22 that is positioned beneath the key 20 within the housing 12 of the mobile device 10. The key 20 in FIGS. 20-22 includes a selection rod 94, a central button 96, and a post 28. The central button 96 includes an interior space 98 that holds a fluid and a top surface 102 that has an opening 104 for receiving the selection rod 94. The top surface 102 is preferably designed such that fluid cannot leak around the selection rod 94 as its pressed into the fluid in the interior space 98. Any type of fluid may be used, such as, for example, an oil-based or gel-based liquid, the invention not being limited to the particular type of fluid used. The selection rod 94 is aligned longitudinally with the post 28. Similar to the design shown in FIGS. 5-8, as the selection rod 94 is pressed downwardly by a user's finger F, the central button 96 and post 28 move upwardly to meet the user's finger F. This may be accomplished via a piston, such as an air-filled piston, or a spring or linkage mechanism, among other known techniques. When the user's finger F engages the top surface 102 of the central button 96, a greater surface area is provided such that the user can more readily press the key 20 downwardly in order to engage the dome switch 22 via the post 78. A seal, such as a ring seal, (not shown) may be positioned around the opening 104 in the top surface 102 to allow the selection rod 94 to enter the fluid in the interior space 98 without leaking. After the dome switch 22 has been engaged and the user releases the key, the key 20 returns to an at rest position, as shown in FIG. 20. This may be accomplished by a spring positioned inside the fluid and by the dome switch 22 rebound or by another spring mechanism. The force required to press the selection rod 94 into the fluid is the same as or less than the force to trigger the underlying dome switch 22, such that a user has to press downwardly on the central button 96 in order to activate the dome switch 22.

FIGS. 23-25 are similar in some aspects to FIGS. 20-22. FIGS. 23-25 depict an example key 20 having a central button 96 that houses a fluid in an interior space 98, a selection rod 94, and a post 28. The post 28 is coupled to a transverse shelf member 114 that is perpendicular to the longitudinal axis of the post 28 and seats in the interior space 98 of the central button 96. In one example, as the selection rod 94 is pressed into the fluid in the interior space 98, the post 28 moves downwardly as the fluid is displaced by the selection rod 94. The transverse shelf member 114 includes a seal 122 so that fluid cannot flow around the shelf member 114 and escape the interior space 98 of the central button 96. In addition, as discussed above in connection with FIGS. 20-22, seals (not shown) may be provided around the opening 104 in the top surface 102 so that fluid cannot flow around the selection rod 94. In this example, as the selection rod 94 is pressed into the fluid, the user's finger F engages the top surface 102 of the central button 96, providing a greater surface area. Then the user presses downwardly in order to engage the post 28 against the dome switch 22. In an alternative example, the central button 96 rises up to meet the user's finger F, as described in connection with FIGS. 20 to 22. One type of material that can be used as the fluid inside the interior space 98 of the central button 96 is a gel or oil. The force required to press the selection rod 94 into the fluid is the same as or less than the force to trigger the underlying dome switch 22, such that a user has to press downwardly on the central button 96 in order to activate the dome switch 22.

FIGS. 26-27 represent an alternative example key 20 having a tilting upper portion 124 that is coupled to a post 28. The upper portion 124 is coupled to the post 28 via a pivot or flex joint 126. Other types of joints may alternatively be utilized. For example, the pivot 126 could be a living hinge, a ball joint, a pin, or any other type of mechanical or chemical joint (such as a rubber joint). The post 28 is connected to the upper portion 124 at a center point C such that in a resting position, the upper portion 124 is perpendicular to the post 28 (as shown in FIG. 26). When the user selects a key 20a, the user's finger F engages the upper portion 124 of the selected key 20a. The keys 20b on either side of the selected key 20a rotate or tilt out of the way, allowing the user to press the selected key 20a. Thus, in order to operate the key 20a in this example, a longitudinal force must be applied to the post 28 via the upper portion 124. If an angled force is applied to the upper portion 124 of a key, the upper portion 124 will tilt, making it more difficult to press the key 20. This design allows for greater accuracy in the selection of a particular key, making the keys 20 easier to select by a user. Although not shown, the keys 20 in this example could even overlap because the non-selected keys 20 would rotate out of the way. This allows for larger key 20 sizes on a smaller form factor. The force to activate the dome switch 22 in this case is greater than or equal to the tilting force of the keys 20. In addition, if desired, the non-selected, tilting keys 20b could hit the surface of the housing 12 to prevent accidental activation of the non-selected key 20b. In this key, the post 28 and/or the upper portion 124 could both be plastic or elastic, such as rubber.

FIGS. 28-30 depict another example key 20 where the housing 12 of the mobile device 10 includes a movable portion that operates along side the keys 20 to aid in selection of the desired key 20. Each key 20 in this design is T-shaped, with a downwardly, longitudinally extending post 28 and a transversely extending upper portion 30. Angled wings 128 couple the upper portion 30 to the post 28, providing an angled surface on the post 28 directly adjacent to the upper portion 30. In addition, the housing 12 includes camming blocks 132, which are the movable portion of the housing 12, that have cam surfaces 134 that interact with the keys 20. The camming blocks 132 have an upper surface 136, which may be flat, an angled side surface 134 extending from the upper surface 136, and substantially vertical side surfaces 138, although the side surfaces 138 could be arranged differently.

In operation, when the user selects a key 20 and presses it downwardly, the spaces between the camming blocks are such that the upper portion 30 of the selected key 20a engages the angled side surfaces 134 of the adjacent camming blocks 132. Because the angled side surfaces 134 of the camming blocks 132 are angled, the upper portion 30 of the key 20a presses or rocks the adjacent camming blocks 132 outwardly, which in turn causes adjacent keys 20b to rotate away from the selected key 20a. Thus, in this example, the keys 20 are preferably configured to rock from side to side. This example key system provides a greater area of operation for a single key, making the key 20 easier to press. This also makes the likelihood of mis-typing less likely because more space is provided for a user's finger F to press the key 20 downwardly. Ultimately, the key 20a engages the dome switch 22. After the key 20a is released, the key 20a returns to its original position shown in FIG. 28, as do the adjacent keys 20b and camming blocks 132. The camming blocks 132 could be made of a solid material, like plastic, a semi-flex material, such as rubber, or another material. The camming blocks 132 can be positioned under the housing 12, or form part of the housing 12. The housing 12 is not shown in FIGS. 28-30, but could be provided as a grid over the camming blocks 132, if desired. The camming blocks 132 are preferably coupled to the housing 12 in a rotatable manner via a base 142, with a linkage or other mechanism (not shown) such that they are movable based upon the movement of the adjacent keys 20. The keys 20 could be coupled to the housing 12 in the same or a similar manner.

FIGS. 31-32 depict another example key 20 configuration where the action of one key 20a serves to lock the adjacent keys 20b in place, thereby preventing unintended selection of a key 20b and making the keys 20 easier to use in a compact form. FIG. 31 depicts the keys 20 and locking blocks 144 in a resting position and FIG. 32 depicts the locking blocks 144 locking adjacent keys 20b. Similar to the example shown in FIGS. 28-30, the keys 20 are T-shaped, with a post 28 that extends longitudinally and downwardly, and an upper portion 30 that extends perpendicular to the post 28. The post 28 includes a shelf portion 146 that is similar to the wings 128 in FIGS. 28 to 30. The shelf portion 146 has a first portion 148 that is cylindrical adjacent the upper portion 30 and a second portion 162 that is downwardly angled or cone-shaped as it extends downwardly to meet the post 28. The first portion 148 of the shelf portion 146 has a size that is less than the size of the upper portion 30 of the key 20 so that a shelf 164 is present between the upper portion 30 of the key 20 and the shelf portion 146. The locking block 144 in this example is similar to the camming block 132 in the prior example, except for the locking block 144 in this example moves horizontally side to side instead of rocking, as with the prior example. In this example, as a key 20a is selected by the user and pressed downwardly, the upper portion 30 acts upon the angled surfaces 134 of the locking block 144, which pushes the blocks horizontally away from the selected key 20a. As the locking blocks 144 move away from the selected key 20a, the top surface 136 of the adjacent locking blocks 144 engage the shelves 164 under the adjacent keys 20b, thereby locking the keys 20b in place and preventing unintended pressing of the adjacent keys 20b. The locking blocks 144 may be made of a stiff material, such as a plastic or metal, or may be made of a semi-rigid material, such as a rubber. The locking blocks 144 are also preferably coupled to a mechanism (not shown) that allows them to move horizontally, rather than rocking. When the key 20a is fully depressed to engage the dome switch 22 and then released, the key 20a, and the adjacent keys 20b, returns to its original position, as do the locking blocks 144.

The example of FIGS. 31-32 is depicted as being a mechanical solution where adjacent keys 20b lock into place using the locking block 144. The same technique could be accomplished electronically. In this example, which is not shown, when a key 20a is selected, a computer processor 18 and programming that are coupled to the keys 20 can sense that the key 20 is selected and lock any adjacent keys 20 in position so that they cannot be pressed. This would require an actuator and/or solenoid that is coupled to each key 20 that would allow the key 20 to be locked in place. A strain gauge could be utilized as the sensor. Alternatively, the adjacent keys 20b could remain unlocked, but the processor 18 would ignore any signal coming from them so that they are locked out electronically, but not physically. In either example, force applied to the keys 20 could be measured and the selected key 20a would be determined based upon the greatest force measured. After a key 20a has been depressed and pressure removed from the key, the remaining adjacent keys 20b would be automatically unlocked.

While not shown, a combination of the locking blocks 144 and keys 20 of FIGS. 31-32 could be used with the technique of FIGS. 28-30 such that the blocks would rock but would also lock adjacent keys 20b in position so that they could not be pressed. In this example, the shoulder 164 under the upper portion 30 would engage the upper surface 136 of the blocks shown in FIGS. 28-30. The blocks 132 would rock outwardly upon the application of force to the selected key 20a, forcing the upper surface 136 of the blocks to engage the shelves 164 of the adjacent keys 20b. This would allow the adjacent keys 20b to rock out of the way while also locking them. The blocks 132 could be coupled to the mobile device 10 via a tapered pin made of spring steel that would allow rocking movement of the block. Other types of materials or mechanisms can also be utilized.

The keys 20 shown may be any variety of shapes, including round, rectangular, oval, square, triangular, irregular, or otherwise. Other shapes and sizes may also be utilized, without limitation FIG. 33 is an exploded view of the hardware of a mobile communication device 10 incorporating an example key arrangement 20 on the keypad 14. The device includes a first device housing section 260 and a second device housing section 262. The housing sections are connected together with fasteners (not shown) that engage a plurality of holes 250, 254 to form a single integrated device housing 12 that encloses the internal components of the mobile communication device 10. The fasteners may be screws, rivets or the like. Fasteners are but one example of possible components that may be used to couple the device housing sections together. Other components include flexible or rigid but deformable members, possibly integral with one of the device housing sections, which engage cooperating structures on the other or each device housing section or are deformed to hold the device housing sections together. The device housing sections might also or instead be coupled together by bonding, with adhesive, for example. However, the device housing sections are preferably coupled together using releasable fasteners such as screws.

The device 10 depicted in FIG. 33 includes a PCB (printed circuit board) 264. Most of the internal components of the mobile communication device 10 are preferably mounted on the PCB 264. The keypad 14 is preferably formed by positioning a key web 233A over a plurality of switches 233B on the PCB 264. The key web 233A and plurality of switches 233B are preferably configured such that each key 20 in the key web 233A contacts and operates one of the switches 233B when the key 20 is depressed. Other configurations may also be implemented, in which the number of switches 233B may be less than the number of keys 20 on the key web 233A, or the number of switches 233B may be greater than the number of keys 20 on the key web 233A. The key web 233A and switches 233B are also positioned such that the apertures 235 on the first device housing section 260 at least partially expose the keypad 14. Portions of the key web 233A are exposed by the apertures 235 to provide key 20 surfaces that may be depressed by a user to provide data input to the device 10. Such data input may, for example, be used to generate data communications on the device 10.

A display 16 is preferably mounted on the PCB 264. When the first device housing section 260 and second device housing section 262 are coupled together, an aperture 223 in the first device housing section 260 at least partially exposes the display 16. The aperture 223 in the first device housing section 260 and the display 16 on the PCB 264 may be positioned such that a viewing area 225 of the display 16 is exposed. The frame and other components associated with the display 16 are preferably hidden from view when the first and second device housing sections 260, 262 are coupled together.

A speaker 234 is preferably mounted at or near the top of the PCB 264. One or more apertures 235 in the first device housing section 260 are positioned to at least partially expose the speaker 234 when the first and second device housing sections 260, 262 are coupled together. A microphone 236 is mounted in the second device housing section 262. The microphone 236 is at least partially exposed by the aperture 237B in the second device housing section, and coupled to the PCB and other device components. Audio or voice inputs to the microphone 236 may be used, for example, to generate voice communications. When the microphone 236 is positioned in the housing 12, an aperture (not shown) is provided in the first device housing section 260 to at least partially expose the microphone 236. The microphone 236 may alternatively be mounted in the first device housing section 260 or on the PCB 264.

The device housing sections 260, 262 may include further apertures to expose or partially expose other device components. In the first device housing section 260, apertures 270, 272 and 274 are configured to partially expose the auxiliary I/O devices. An aperture 268 is similarly positioned in the second device housing section 262 to at least partially expose an auxiliary I/O device 228D. An aperture 266 in the second device housing section 262 may be provided to accommodate a power supply such as a battery. Other apertures may also be provided in the device housing 12. as necessary.

Other internal components of the device 10 may also be mounted on the PCB 264. The device components are interconnected to provide at least data and voice communication functionality, possibly in addition to further local non-communication functions and short-range communication functions. Although these other internal components are not shown in FIG. 33, most of them are preferably mounted on the rear side of the PCB 264, opposite the side on which the keypad 14, display 16 and speaker 234 are mounted, but some components may be mounted adjacent to the display 16 and/or keypad 14 or on or along an edge of the PCB 264. The internal components of the device 10 are interconnected as necessary, through wired connections, PCB tracks, other types of connectors or connections, or combinations thereof.

The first and second device housing sections 260, 262, when coupled together, form a handheld mobile communication device housing 12 enclosing the PCB 264 and internal components. The apertures 235, 223, 235 and 237B at least partially expose the speaker 234, display 16, keypad 14 and microphone 236 as described above. Partial exposure of these components allows a user to make use of these components while at the same time protecting the components from damage. Apertures 268, 270, 272, 274 similarly expose and protect auxiliary I/O devices. When access to a component will normally be required relatively infrequently, a removable cover element may be provided for a corresponding device housing aperture. In the above example of a device power supply, a cover (not shown) is preferably provided for the aperture 266. Access to the power supply is possible when required, but the battery remains protected when access is not necessary.

The mobile communication device 10 may also include a predictive text computer program that is used in conjunction with the keypad. Predictive test software is useful in reduced format keypads, such as the example keypad, in order to identify the desired input from the combination of keys strokes of a user. A predictive text computer program may, for example, be used to predict a complete word or phrase from one or more keystrokes. If the predictive text computer program does not successfully predict a desired word or phrase, then text-entry characters may be entered more precisely, albeit more slowly, by selecting the appropriate characters on the keys 20. An example predictive text computer program is described in the following co-owned patent applications, which are incorporated herein by reference in their entirety: "Customizable Predictive Text Method For Reduced Keypads," U.S. Provisional Patent Application No. 60/397,680, filed Jul. 23, 2002; "Systems and Methods of Building and Using Custom Word Lists," International Patent Application No. PCT/CA03/01103, filed Jul. 23, 2003, and "Portable Electronic Device With Keypad", International Patent Application No. PCT/CA02/00862, filed Jun. 10, 2002.

The mobile communication devices 10 that may be utilized with the example keys 20 typically include a housing 12, a keypad 14 and an output device 16. An example of a mobile device 10 is shown in FIG. 33. The output device shown is a display 16, which is preferably a full graphic LCD. Other types of output devices may alternatively be utilized. A processing device 18, which is shown schematically in FIG. 34, is contained within the housing 12 and is coupled between the physical keypad 14 and the display 16. The processing device 18 controls the operation of the display 16, as well as the overall operation of the mobile communication device 10, in response to actuation of keys 20 on the keypad 14 by the user.

The housing 12 may be elongated vertically, or may take on other sizes and shapes, including a clamshell housing structure, among other structures. The keypad may include a mode selection key, or other hardware or software for switching between text entry and telephony entry. Other shapes and sizes for the keypad may be utilized.

In addition to the processing device 18, other parts of the mobile communication device 10 are shown schematically in FIG. 34. These include a communications subsystem 100; a short-range communications subsystem; the keypad 14 and the display 16, along with other input/output devices 106, 108, 110 and 112; memory devices 116, 118; and various other device subsystems 120. The mobile communication device 10 is preferably a two-way RF communication device having voice and data communication capabilities. In addition, the mobile communication device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application and incorporated herein by reference.

Communication functions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keypad 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

A keypad for a mobile device having a housing comprises a plurality of keys associated with the housing of the mobile device, each key having means for making the selection of smaller key sizes easier for a user. In one example, the means for making selection of smaller key sizes easier comprises a key having a post and an upper portion, with at least the upper portion being configured to transform in shape to provide a larger surface area for coupling with a finger of a user upon pressing down upon the key.

In another example, the means for making selection of smaller key sizes easier comprises a key having a post and an upper portion, with the upper portion comprising a first portion and a second portion. The first portion is movably coupled to the second portion and the first portion is smaller than the second portion. When the first portion is pressed by a finger of a user, it is subsumed by the second portion such that the finger of the user contacts the second, larger portion, thereby making it easier to press the key. The second portion may travel upwardly as the first portion is pressed such that the second portion joins with the user's finger at a height that is greater than a resting height of the key. The first portion may be coupled to an orifice in the second portion and a spring may be associated with the orifice such that when pressure is applied to the first portion, it is subsumed into the second portion. When pressure is released from the first portion, the first portion springs back to a position wherein the first portion is not fully subsumed by the second portion.

In another example, the means for making selection of smaller key sizes easier comprises a key having a post and an upper portion, with the upper portion having a central part that is movably coupled to a left arm and a right arm. The central part, left arm and right arm are positioned above the housing and, in a resting position, the central part is higher in elevation than the left arm and right arm. When the central part is pressed by a finger of a user, the key moves downwardly such that the left and right arms interact with the housing and the key changes in shape to provide a larger surface area for pressing. The left and right arms may be coupled to the central part via a hinge. The key may further comprise a gear coupled to a pushrod and a rack coupled to the post, with the rack in engagement with the gear and the pushrod in engagement with a switch positioned in the housing such that the post travels a greater distance when pushed than the pushrod. The central part, left arm and right arms may be elastomeric, with the central part and left and right arms being coupled via a living hinge and integral with one another.

In another example, the means for making selection of smaller key sizes easier comprises a key having a center post surrounded by a first post and a second post, with each of the posts being positioned vertically, and an upper, flexible member coupled to the first, second, and center posts. The center post is substantially rectangular in cross-section and the first and second posts are trapezoidal in cross-section. An angled surface of the first and second posts is positioned at an upper end of the respective posts and is angled inwardly and downwardly toward the center post. The application of pressure to the upper member causes the first and second posts to spring upwardly to meet a user's finger, thereby providing a larger surface area for engaging with a user's finger.

In a further example, the means for making selection of smaller key sizes easier comprises a key having an upper part and a lower part that couple together. The lower part includes a post having a recess for receiving a portion of the upper part, with the upper part having an upper wall and two arms extending outwardly from and hinged to the upper wall. The upper wall seats in the recess. When the upper part is pressed by a user's finger, the arms rotate upwardly to meet the finger of the user as they abut the lower part to provide a greater surface area for pressing the key. The lower part may be pitch-fork shaped, with a center post having a height that is lower than the height of two adjacent fork arms. Recesses are formed between the fork arms and the center post. The upper part has two legs that are configured to seat inside the recesses of the lower part, with the arms of the upper part acting against the fork arms of the lower part when the upper part is pressed by a finger of a user such that the arms of the upper part are forced upwardly.

In yet another example, the means for making selection of smaller key sizes easier comprises a key having a post coupled to a central button portion and a selection rod, with the central portion housing a fluid and the selection rod being positioned to enter the fluid upon pressing such that as the selection rod is pressed into the fluid inside the central button portion. The central button portion rises up to meet the finger of a user, thereby providing a larger surface area for the user's finger to engage. The selection rod may be axially aligned with the post and the post may be configured to engage a switch positioned inside the housing. The means may further comprise a spring mechanism for moving the central button portion towards the user's finger as the selection rod is pressed into the fluid. The post may be T-shaped, with the upper part of the "T" being a transverse shelf member that is positioned inside the central button portion and forms the bottom surface of the central button portion. The shelf member is displaced vertically as the selection rod is pressed into the fluid inside the central button portion in order to allow quicker activation of the dome switch. The means may further comprise a seal coupled between the shelf member and an inner surface of the central button portion, and a seal coupled between the central button portion and the selection rod.

In another example, the means for making selection of smaller key sizes easier comprises a key having a post coupled to an upper portion via a pivot. When one of the keys is pressed by a user's finger, the keys adjacent the pressed key tilt out of the way.

In a further example, the means for making selection of smaller key sizes easier comprises a key having a post coupled to an upper portion, and a camming block positioned between each key. The camming block has an angled, camming surface positioned adjacent each key. When pressure is applied to one of the keys, the upper portion of the key interacts with the camming surface of the block in order to rock the block sideways and out of the path of the user's finger in order to ensure that only the selected key is pressed.

In another example, the means for making selection of smaller key sizes easier comprises a key having a post coupled to an upper portion, and a camming block positioned between each key. The block has a camming surface positioned adjacent each key and an upper locking surface at the top of the block. When the selected key is pressed by a user's finger, the key moves downwardly along the camming surfaces of the adjacent blocks, thereby moving the block sideways such that the blocks slide under adjacent keys in order to lock them in a non-activating position.

In a further example, the means for making selection of smaller key sizes easier comprises a key having a post coupled to an upper portion and each key is associated with a movement sensor and a locking mechanism, which is coupled to a processor having programming that is positioned inside the housing. When a key is selected for pressing by a user's finger, the associated sensor determines that the key is being pressed and sends an electronic signal to the processor which signals any adjacent keys to lock into position utilizing the locking mechanism.

In yet another example, a keypad for a mobile device having a housing comprises a plurality of keys associated with the housing. Each key has a lower portion and an upper portion. The upper portion is for contacting a user's finger. The upper portion is flexible for transforming in shape to substantially conforming to the shape of a user's finger.

In a further example, a keypad for a mobile device having a housing comprises a plurality of keys associated with the housing. Each key is made of an elastomeric material such that at least a portion of the key is flexible. An upper surface of the key may be flexible.

In another example, a keypad for a mobile device having a housing comprises a plurality of keys associated with the housing. Each key is configured to rotate away from a selected key when the selected key is pressed by a finger of a user.

In yet another example, a keypad for a mobile device having a housing comprises a plurality of keys associated with the housing. Each key is configured to transform from a small surface area to a larger surface area upon the application of pressure to the small surface area of the key by a finger of a user. The small surface area may be associated with a smaller portion having a top surface. The larger surface area may be associated with a larger portion having a top surface. The smaller portion may be positioned to be initially pressed by a user's finger, and the top surface of the larger portion rises up to meet the top surface of the smaller portion via a mechanism.

In another example, a keypad for a mobile device having a housing comprises a plurality of keys associated with the housing. Each key is associated with a locking mechanism. When one of the keys is selected by a finger of a user, any keys adjacent the selected key are locked into position so that they cannot be accidentally depressed.

In a further example, a keypad for a mobile device having a housing comprises a plurality of keys associated with the housing. Each key is configured to tilt from side to side in response to a downward force from a user's finger. When the downward force from a user's finger is axially aligned with a longitudinal axis of a selected key, the key does not tilt and is pressable by a user.

In another example, a keypad for a mobile device having a housing comprises a plurality of keys associated with the housing. Each key has an upper surface that is deformable upon pressing with a finger of a user.

In yet another example, a keypad for a mobile device having a housing comprises a plurality of keys associated with the housing. Each key has a first part coupled to a second part. In a resting position, the first part is positioned higher than the second part. Upon activation by applying pressure to the first part, the second part rises to meet the first part.

In a further example, a keypad for a mobile device having a housing comprises a plurality of keys associated with the housing. Each key has an upper portion that comprises an upper surface. The upper portion comprises at least two parts, with the parts being movable relative to one another and connected together via a linkage. The upper portion may comprise three parts, with two of the parts being rotatable relative to one of the parts.

In another example, a keypad for a mobile device having a housing comprises a plurality of keys associated with the housing. Each key has a first, lower part, and a second, upper part. The upper part is positioned inside a recess of the lower part and movable relative thereto.

In yet another example, a keypad for a mobile device having a housing comprises a plurality of keys associated with the housing. Each key has a switch engaging portion, a central portion housing a fluid, and an upper portion configured to enter the fluid upon the application of a pressure thereto.

In a further example, a keypad for a mobile device having a housing comprises a plurality of keys associated with the housing. Each key has a stem and a perpendicular top wall that is coupled to the stem via a linkage. The top wall is rotatable relative to a longitudinal axis of the stem.

In another example, a keypad for a mobile device having a housing comprises a plurality of keys associated with the housing. Each key has three parts including two outer parts positioned around an inner part. The outer part is movable relative the inner part.

The term "substantially," as used herein, is a term of estimation. While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A keypad for a mobile device comprising:
    a housing structure with apertures;
    a plurality of dome switches located within the housing structure beneath the apertures; and
    a plurality of keys, each of which includes a body of elastic material having a bottom surface within the housing structure in alignment with a respective one of the dome switches, a post portion projecting through a respective one of the apertures, and an upper portion with a top surface located outside the housing structure above the respective one of the apertures, with the upper portion configured to move the post portion downward under the force of a user's finger pressing down upon the upper portion to press the bottom surface of the key downward to actuate the respective dome switch, and with the upper portion further configured to transform in shape by contracting vertically and expanding horizontally outward to provide a larger surface area for coupling with the user's finger pressing down upon the upper portion.

2. A keypad as defined in claim 1 wherein the upper portion of each body of elastic material is dome-shaped and configured to expand in diameter upon expanding horizontally outward.

* * * * *